(12) United States Patent
Krishnaswamy et al.

(10) Patent No.: US 11,281,519 B2
(45) Date of Patent: Mar. 22, 2022

(54) HEALTH INDICATOR PLATFORM FOR SOFTWARE REGRESSION REDUCTION

(71) Applicant: Microsoft Technology Licensing, LLC, Redmond, WA (US)

(72) Inventors: Chandramouleeswaran Krishnaswamy, Bellevue, WA (US); Mark R. Gilbert, Issaquah, WA (US); Neetha Sumana Tuluri, Sammamish, WA (US); Parminder Pal Singh, Redmond, WA (US); Rahul Nigam, Bothell, WA (US); Bhuvnesh Kumar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 296 days.

(21) Appl. No.: 16/511,827

(22) Filed: Jul. 15, 2019

(65) Prior Publication Data
US 2021/0019209 A1   Jan. 21, 2021

(51) Int. Cl.
*G06F 11/00* (2006.01)
*G06F 11/07* (2006.01)
(Continued)

(52) U.S. Cl.
CPC .............. *G06F 11/079* (2013.01); *G06F 8/65* (2013.01); *G06F 11/0751* (2013.01); *G06F 11/0772* (2013.01); *G06N 20/00* (2019.01)

(58) Field of Classification Search
CPC . G06F 8/60; G06F 8/65; G06F 11/079; G06F 11/3668; G06F 11/0751; G06F 11/0772; G06N 20/00
See application file for complete search history.

(56) References Cited

U.S. PATENT DOCUMENTS

| 8,732,693 B2 | 5/2014 | Mutisya et al. |
| 9,092,287 B2 * | 7/2015 | Dubey ............... G06F 11/3466 |

(Continued)

OTHER PUBLICATIONS

"Enhanced Health Reporting and Monitoring", Retrieved from: https://docs.aws.amazon.com/elasticbeanstalk/latest/dg/health-enhanced.html, Retrieved Date: May 15, 2019, 10 Pages.

(Continued)

*Primary Examiner* — Jonathan D Gibson
(74) *Attorney, Agent, or Firm* — Michael Best & Friedrich LLP

(57) ABSTRACT

Systems and methods for automatically reducing regression for a software payload applied to a plurality of computing platforms by a software updater. One example method includes receiving a health request associated with the payload, and retrieving, from an escalation engine, a plurality of identifiers identifying a subset of the plurality of computing platforms that have completed deployment of the payload, and determining a plurality of ULS tags associated with the payload. The method includes querying an anomaly detector for failure data, including pre and post-deployment data, for the subset corresponding to the ULS tags, detecting a potential software regression associated with the payload by comparing the pre and post-deployment data, and querying a root cause analyzer based on the potential regression. The method includes receiving an identifier identifying a potential root cause for the potential regression, and transmitting an event based on the potential regression and the potential root cause.

20 Claims, 3 Drawing Sheets

(51) Int. Cl.
*G06N 20/00* (2019.01)
*G06F 8/65* (2018.01)

(56) References Cited

U.S. PATENT DOCUMENTS

| | | | |
|---|---|---|---|
| 9,383,989 | B1 | 7/2016 | Qi et al. |
| 10,102,114 | B1 | 10/2018 | Jing et al. |
| 10,379,838 | B1* | 8/2019 | Chud .................... G06F 11/079 |
| 10,649,834 | B2* | 5/2020 | Dhayapule ................ G06F 8/60 |
| 10,678,626 | B2* | 6/2020 | Dhayapule .......... G06F 11/1433 |
| 10,817,283 | B1* | 10/2020 | Naik .................... G06Q 10/103 |
| 2012/0272103 | A1 | 10/2012 | Calinoiu et al. |
| 2014/0101717 | A1* | 4/2014 | Hajost ....................... G06F 8/71 726/1 |
| 2015/0052402 | A1* | 2/2015 | Gurumurthy ....... G06F 11/3688 714/38.1 |
| 2015/0324182 | A1* | 11/2015 | Barros ................ G06F 9/44505 717/174 |
| 2016/0034270 | A1 | 2/2016 | Swierc et al. |
| 2016/0364286 | A1* | 12/2016 | Charters .................. G06F 8/61 |
| 2019/0108115 | A1 | 4/2019 | Gonen |
| 2019/0155674 | A1* | 5/2019 | Dhayapule .......... G06F 11/1433 |
| 2020/0104110 | A1* | 4/2020 | Singh .................... G06F 11/079 |
| 2021/0055995 | A1* | 2/2021 | Biernacki ........... G06F 11/3664 |

OTHER PUBLICATIONS

"Getting Started with the Health Checks API", Retrieved from: https://docs.cloud.oracle.com/iaas/Content/HealthChecks/Concepts/healthchecks-api-guide.htm, Retrieved Date: May 15, 2019, 08 Pages.

"Monitor service health", Retrieved from: https://docs.servicenow.com/bundle/madrid-it-operations-management/page/product/event-management/task/t_EMViewDashboard.html, Retrieved Date: May 15, 2019, 06 Pages.

"Tracking errors after deployments with Rollbar and CircleCI", Retrieved from: https://circleci.com/blog/tracking-errors-after-deployments-with-rollbar-and-circleci/, Jun. 19, 2018, 12 Pages.

"International Search Report and Written Opinion Issued in PCT Application No. PCT/US20/034727", dated Sep. 18, 2020, 13 Pages.

* cited by examiner

HEALTH INDICATOR PLATFORM FOR SOFTWARE REGRESSION REDUCTION

FIELD

Embodiments described herein relate to automatic reduction of software regression and, in particular, to systems and methods for detecting unhealthy software payloads and preventing the rollout of unhealthy software payloads to computing platforms in cloud computing environments.

SUMMARY

Cloud computing and other shared computing environments include multiple computing platforms to provide software applications and services to users via the Internet and other networks. Applications that provide content creation, communication, and data storage and manipulation interact with one another and one or more hosting platforms. The software code for the applications and the platforms is regularly updated to add features, correct errors, respond to user requests, and the like. In some cases, software payloads that may include many thousands of code changes across some or all of the applications are rolled out to the computing platforms. Application of the software payloads to software systems sometimes results in software regression and software performance regression.

To help prevent software regression caused by software payload rollouts, embodiments described herein, among other things, automatically detect potential regressions as a software payload begins to rollout, and prevents the software regression from propagating to all platforms in a computing environment. Using certain embodiments presented herein, software regression is detected and mitigated early in a payload rollout, resulting in a better user experience. Some embodiments described herein therefore result in more efficient use of computing system resources, and improved operation of computing systems for users.

In particular, one embodiment provides a system for automatically reducing software regression for a software payload applied to a plurality of computing platforms by a software updater. The system includes an anomaly detector configured to analyze telemetry data for the computing platforms to produce failure data for the computing platforms, an escalation engine configured to receive payload rollout data from the software updater and track state information for the computing platforms, and a decision engine communicatively coupled to the plurality of computing platforms, the software updater, the anomaly detector, and the escalation engine. The decision engine includes an electronic processor. The electronic processor is configured to receive, from the software updater, a health request associated with the software payload. The electronic processor is configured to, in response to receiving the health request, retrieve, from the escalation engine, a plurality of identifiers identifying a subset of the plurality of computing platforms that have completed deployment of the software payload. The electronic processor is configured to determine a plurality of unified logging service (ULS) tags associated with the software payload. The electronic processor is configured to query the anomaly detector for failure data, for the subset of the plurality of computing platforms, corresponding to the ULS tags, the failure data including pre-deployment failure data and post-deployment failure data. The electronic processor is configured to detect a potential software regression associated with the software payload by comparing the pre-deployment failure data and the post-deployment failure data. The electronic processor is configured to, in response to detecting a potential software regression, transmit, to the escalation engine, an event based on the potential software regression.

Another embodiment provides a method for automatically reducing software regression for a software payload applied to a plurality of computing platforms by a software updater. The method includes receiving, from a software updater, a health request associated with the software payload. The method includes, in response to receiving the health request, retrieving, from an escalation engine, a plurality of identifiers identifying a subset of the plurality of computing platforms that have completed deployment of the software payload. The method includes determining a plurality of unified logging service (ULS) tags associated with the software payload. The method includes querying an anomaly detector for failure data, for the subset of the plurality of computing platforms, corresponding to the ULS tags, the failure data including pre-deployment failure data and post-deployment failure data. The method includes detecting a potential software regression associated with the software payload by comparing the pre-deployment failure data and the post-deployment failure data. The method includes, in response to detecting a potential software regression, querying a root cause analyzer based on the potential software regression. The method includes receiving, from the root cause analyzer, at least one change list identifier identifying at least one potential root cause for the potential software regression. The method includes transmitting, to an escalation engine, an event based on the potential software regression and the at least one potential root cause.

Yet another embodiment provides a non-transitory computer-readable medium including instructions executable by an electronic processor to perform a set of functions. The set of functions includes receiving, from a software updater, a health request associated with the software payload. The set of functions includes, in response to receiving the health request, retrieving, from an escalation engine, a plurality of identifiers identifying a subset of the plurality of computing platforms that have completed deployment of the software payload. The set of functions includes determining a plurality of unified logging service (ULS) tags associated with the software payload. The set of functions includes querying an anomaly detector for failure data, for the subset of the plurality of computing platforms, corresponding to the ULS tags, the failure data including pre-deployment failure data and post-deployment failure data. The set of functions includes detecting a potential software regression associated with the software payload by comparing the pre-deployment failure data and the post-deployment failure data. The set of functions includes, in response to detecting a potential software regression, querying a root cause analyzer based on the potential software regression. The set of functions includes receiving, from the root cause analyzer, at least one change list identifier identifying at least one potential root cause for the potential software regression. The set of functions includes transmitting, to an escalation engine, an event based on the potential software regression and the at least one potential root cause.

DETAILED DESCRIPTION

Figure 1:
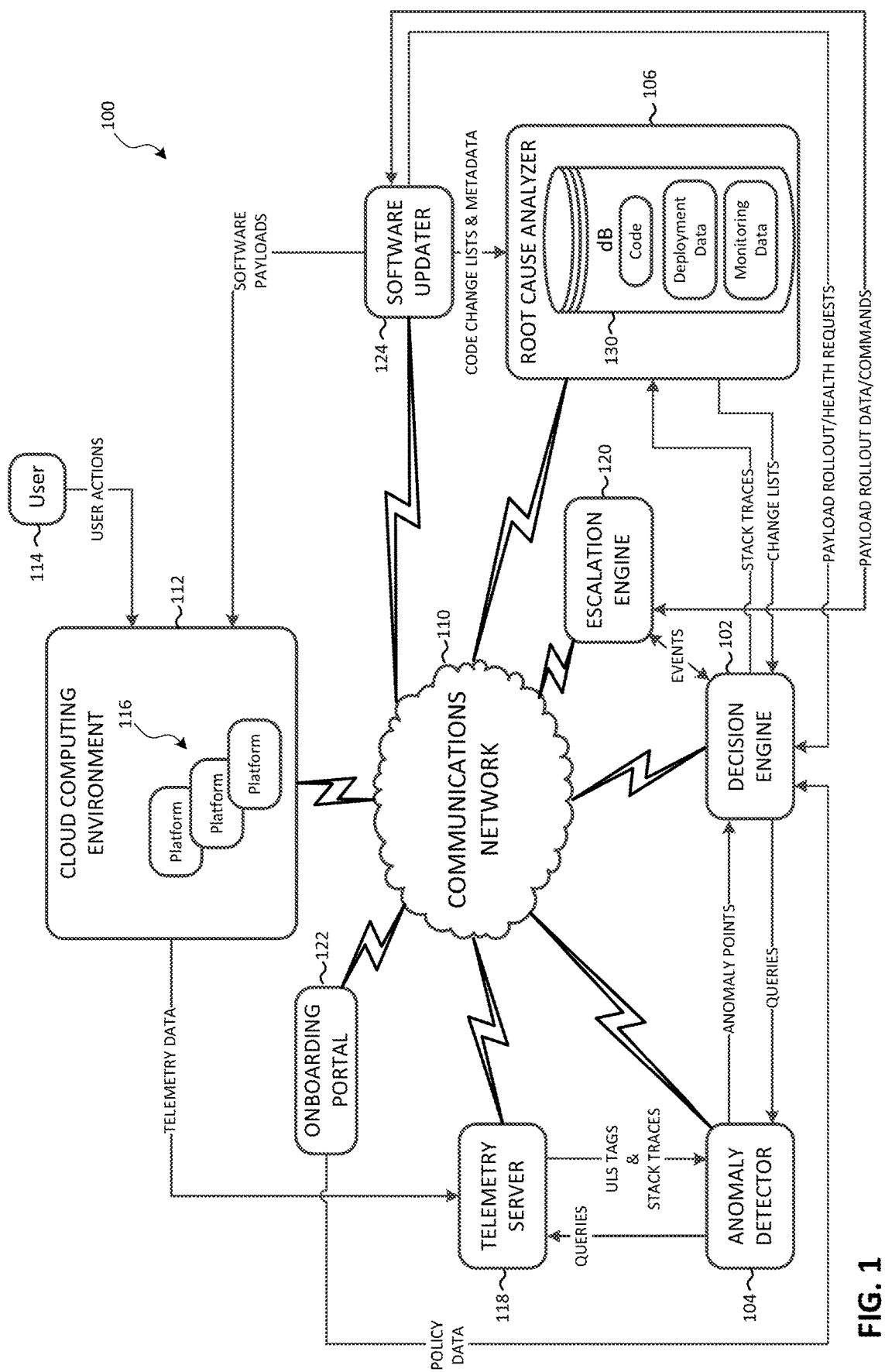
FIG. 1 schematically illustrates a system for automatically reducing software regression for a software payload applied to a plurality of computing platforms by a software updater according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As noted, batch software updates may result in software regressions that reduce computing system performance for affected users. Accordingly, embodiments described herein analyze telemetry data and use automated root cause analysis to identify and rollback offending software code changes and recover from software regression.

FIG. 1 illustrates an example system 100 for automatically recovering from software regression. The system 100 includes a decision engine 102, an anomaly detector 104, a root cause analyzer 106, and an escalation engine 108. It should be understood that the system 100 is provided as one example and, in some embodiments, the system 100 includes fewer or additional components in various configurations. For example, the system 100 may include multiple decision engines 102, multiple anomaly detectors 104, multiple root cause analyzers 106, or combinations thereof.

The decision engine 102, the anomaly detector 104, the root cause analyzer 106, the escalation engine 108, and other illustrated components are communicatively coupled via a communications network 110. The communications network 110 may be implemented using a wide area network (for example, the Internet), a local area network (for example, an Ethernet or Wi-Fi™ network), a cellular data network (for example, a Long Term Evolution (LTE™) network), and combinations or derivatives thereof.

Figure 2:
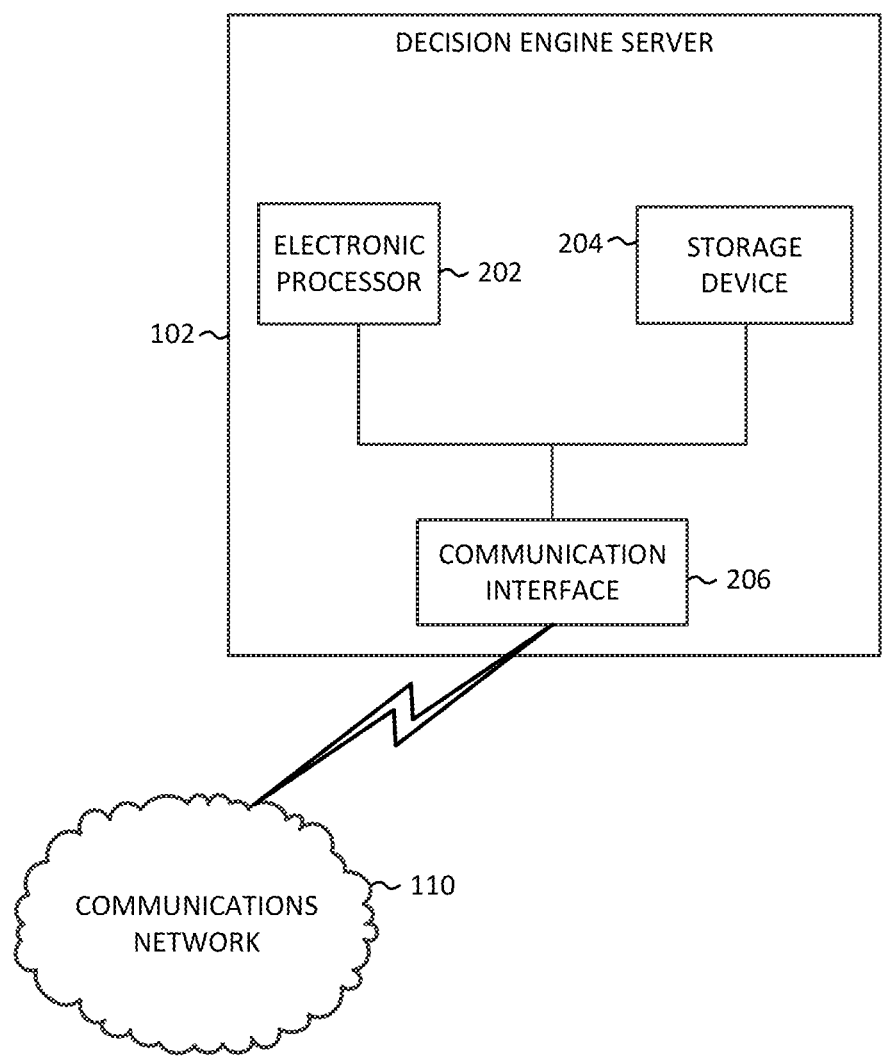
FIG. 2 schematically illustrates a decision engine server according to some embodiments.

FIG. 2 schematically illustrates the decision engine 102 in more detail. In the example provided in FIG. 2, the decision engine 102 is a computing device (for example, a network-attached server) including an electronic processor 202 (for example, a microprocessor, application-specific integrated circuit (ASIC), or another suitable electronic device), a storage device 204 (for example, a non-transitory, computer-readable storage medium), and a communication interface 206, such as a transceiver, for communicating over the communications network 110 and, optionally, one or more additional communication networks or connections. It should be understood that the decision engine 102 may include additional components than those illustrated in FIG. 2 in various configurations and may perform additional functionality than the functionality described in the present application. Also, it should be understood that the functionality described herein as being performed by the decision engine 102 may be distributed among multiple devices, such as multiple servers and may be provided through a cloud computing platform, accessible by components of the system 100 via the communications network 110. In some embodiments, the decision engine 102 performs functionality described herein as being performed by other components (for example, the anomaly detector 104).

The electronic processor 202, the storage device 204, and the communication interface 206 included in the decision engine 102 are communicatively coupled wirelessly, over one or more communication lines or buses, or a combination thereof. The electronic processor 202 is configured to retrieve from the storage device 204 and execute, among other things, software to perform the methods described herein.

Returning to FIG. 1, the decision engine 102, the anomaly detector 104, the root cause analyzer 106, and the escalation engine 108 exchange information via the communications network 110 and operate to automatically predict and prevent software regression, for example, in a cloud computing environment 112. The cloud computing environment 112 operates to provide users (for example, the user 114) with applications and other computing services remotely, via one or more computing platforms 116. In some embodiments, each computing platform is a dedicated software environment (for example, a virtual server), which is secured from the other platforms and accessible by an authorized group of users. It should be understood that embodiments of the cloud computing environment 112 may include multiple platforms for serving tens, hundreds, or thousands of users. In some embodiments, the cloud computing environment 112 operates on a Microsoft® Azure® platform. Each of the platforms 116 may execute one or more operating systems, applications, or both. Examples of provided applications include Microsoft Office® and Office365® suites of applications (for example, Outlook®, Word®, Excel®, PowerPoint®, Internet Explorer®, and the like). In some embodiments, one or more of the platforms 116 provide hosting, collaboration, or other software services, such as, for example, the OneDrive® and SharePoint® platforms produced by Microsoft Corporation.

As users (for example, the user 114) interact with the platforms 116 of the cloud computing environment 112, telemetry data is generated. Telemetry data includes data points representing requests received by applications, dependencies (calls to external services), traces (for example, diagnostic logging), events, performance metrics, and the like. The telemetry data also includes data points representing exceptions, for example, errors associated with one or more operations of the operating systems and software applications hosted by the plurality of platforms 116. In some embodiments, the cloud computing environment 112 provides the telemetry data to a telemetry server 118 using, for example, a unified logging service (ULS). In some embodiments, the telemetry server 118 is a network-attached and accessible computer server that includes similar components as the decision engine 102. As described herein, the telemetry server 118 receives queries of telemetry data from the anomaly detector 104 and transmits telemetry data, including ULS tags and stack traces (for example, from software exceptions), to the anomaly detector 104.

In some embodiments, the anomaly detector 104 is a network-attached and accessible computer server that includes similar components as the decision engine 102. The anomaly detector 104 is configured to detect software failures (software regression) on the platforms 116. A software failure, as described herein, may include a failure of a particular software feature to operate, an increased latency of a particular software feature, or a decreased reliability of a particular software feature. It should be understood that software features may include features of operating systems, applications, or other types of software operating on the platforms 116, the failure of which features degrades user experience, system performance, or both.

In some embodiments, the anomaly detector 104 detects a software failure for a platform 116 by analyzing the telemetry data for the platform in question. For example, the anomaly detector 104 may detect a software failure for a platform when the error count for a particular failure type exceeds a predetermined failure threshold. The anomaly detector 104 may use the failure threshold to avoid reporting false positives or low impact problems to the decision engine 102. A false positive may be caused, for example, by user error, such as entry of a bad credential or corrupt data. In such case, a critical exception may be logged, but that exception may only occur once, or may occur several times but for just a single user (as determined by the ULS tag). In another case, multiple exceptions of a similar type may be received, each from a different user, exceeding the threshold for reporting to the decision engine 102.

In some embodiments, the anomaly detector 104 is configured to detect failures by applying a machine learning model (for example, a convolutional neural network trained on historical telemetry data associated with known failures and known successful operation of the platform in question). Accordingly, the anomaly detector 104 may be trained using machine learning techniques to establish an operational baseline for the platform 116, which the anomaly detector 104 uses to detect failures (such as an amount or frequency of failures) deviating from the baseline. In some embodiments, the anomaly detector 104 detects a software failure for a platform 116 using a support vector machine to assess how many users are affected over how many sites. For example, the anomaly detector 104 may determine that a software failure has occurred when a particular error affects a number of users that exceeds a predetermined threshold of users. In some embodiments, the anomaly detector 104 uses weighted graphs to detect a software failure for a platform 116 operating on a cluster.

The applications and services hosted by the platforms 116 within the cloud computing environment 112 are provided by, among other things, electronic processors executing software code. Developers of the platforms 116 and the cloud computing environment 112 patch and update the software code using a software updater 124. In some embodiments, the software updater 124 is a network accessible server that includes similar components as the decision engine 102. The software updater 124 operates to rollout software payloads (including one or more software updates) to the platforms 116. In some embodiments, software payloads may include many (for example, one thousand or more) changes to the code executed by the cloud computing environment 112. In some embodiments, the code changes are released using software flighting, which includes information that defines which software features area enabled for which applications or services. In some embodiments, the implementation of code changes is controlled using a kill switch service, which allows the cloud computing environment 112 to activate code changes in a controlled fashion. In some embodiments, the software updater 124 requests a health indication for a software payload before rolling it out to one or more of the platforms 116.

In some embodiments, the root cause analyzer 106 is a network-attached and accessible computer server that includes similar components as the decision engine 102. The root cause analyzer 106 includes a database 130. The database 130 electronically stores information relating to the cloud computing environment 112. In the embodiment illustrated, the database 130 is locally stored on the root cause analyzer 106. In alternative embodiments, the database 130 is a database housed on a suitable database server communicatively coupled to and accessible by the root cause analyzer 106. In some embodiments, the database 130 is part of a cloud-based database system external to the system 100 and accessible by the root cause analyzer 106 over one or more additional networks. In some embodiments, as illustrated in FIG. 1, the database 130 electronically stores or accesses code data, deployment data, and monitoring data.

The code data includes information about the code executed by the cloud computing environment 112. In some embodiments, code data includes information provided to the root cause analyzer 106 by the software updater 124, including a series of code change lists that make up the software payloads and metadata associated with the software payloads. In some embodiments, the metadata includes a plurality of key value pairs, each including a software feature and a code segment associated with the software feature, identifying which code segment implements which software feature. The metadata may also include data on change list owners (for example, contact information for a software developer or engineer responsible for the code changes in the change list). The metadata may also identify whether the software features are controlled using a reversion mechanism, for example, a flight on rails service or a kill switch service. Deployment data includes information on the platforms 116 hosting the applications and services, including which software build is being executed and which software payloads have been rolled out to which platforms. Monitoring data includes alerts, exceptions, and performance metrics. In some embodiments, the monitoring data includes telemetry data, for example, telemetry data received from the cloud computing environment 112 or the telemetry server 118.

In some embodiments, the root cause analyzer 106 uses various machine learning methods to analyze the data stored in the database 130. Machine learning generally refers to the ability of a computer program to learn without being explicitly programmed. In some embodiments, a computer program (sometimes referred to as a learning engine) is configured to construct a model (for example, one or more algorithms) based on example inputs. Supervised learning involves presenting a computer program with example inputs and their desired (actual) outputs. The computer program is configured to learn a general rule (a model) that maps the inputs to the outputs in the training data. Machine learning may be performed using various types of methods and mechanisms. Example methods and mechanisms include decision tree learning, association rule learning, artificial neural networks, inductive logic programming, support vector machines, clustering, Bayesian networks, reinforcement learning, representation learning, similarity and metric learning, sparse dictionary learning, and genetic algorithms. Using some or all of these approaches, a computer program may ingest, parse, and understand data and progressively refine models for data analytics, including image analytics. Once trained, the computer system may be referred to as an intelligent system, an artificial intelligence (AI) system, a cognitive system, or the like.

Using machine learning, for example, a random forest analysis, the root cause analyzer 106 analyzes the software payloads applied to the cloud computing environment 112. The root cause analyzer 106 determines dependencies among the software features and the code changes in the software payloads. The root cause analyzer 106 also analyzes which software features might be affected by which software payloads. Based on data analysis, the root cause analyzer 106 generates a list of possible root causes of a failures, for example, as detected by the anomaly detector 104, where the possible root causes are representative of one or more code changes included in one or more software payloads. In some embodiments, the root cause analyzer 106 determines, for each possible root cause, a relevancy score. A relevancy score is a numerical value (for example, a decimal number, an integer, or a percentile) that indicates how relevant the possible root cause is to a failure of a particular software feature. For example, the higher the relevancy score of a possible root cause with respect to a software feature, the more likely it is that the possible root cause is responsible for a software regression involving that feature. In some embodiments, the list of possible root causes only includes possible causes having a relevancy score satisfying a predetermined score threshold. In some embodiments, relevancy scores may be able to compare possible root causes. For example, a possible root cause having a relevancy score greater than the relevancy score for another possible root cause is considered more relevant to a particular software feature than the other possible root cause.

In some embodiments, the escalation engine 120 is a network-attached and accessible computer server that includes similar components as the decision engine 102. The escalation engine 120 receives payload rollout data from the software updater 124, which it uses to track the current state of the cloud computing environment 112 and the computing platforms 116. For example, payload rollout data includes information about which software payloads have been rolled out to which of the platforms 116, and which of the platforms 116 have completed the rollout (that is, which have applied the software changes included in the payload). The escalation engine 120 receives events (for example, requests to take action regarding a particular software payload) from the decision engine 102. In response to receiving the events, the escalation engine 120 may log the events to an incident management system (IcM), issue commands to the software updater 124 (for example, to stop a software payload from rolling out to more platforms), or both.

In some embodiments, the system 100 and the platforms 116 may be used by one or more partners. A partner is a group of users, for example, an organization or a division within an organization. Embodiments of the system 100 operate to receive configuration and other types of information from partners via an onboarding portal 122. For example, a partner may submit policies for their platform(s) that indicate thresholds used to detect anomalies, which failures represent critical failures to their users, and the like. In some embodiments, the partners submit machine learning models, which are used by the anomaly detector 104 to determine whether a software failure is occurring on a partner's platform(s).

Figure 3:
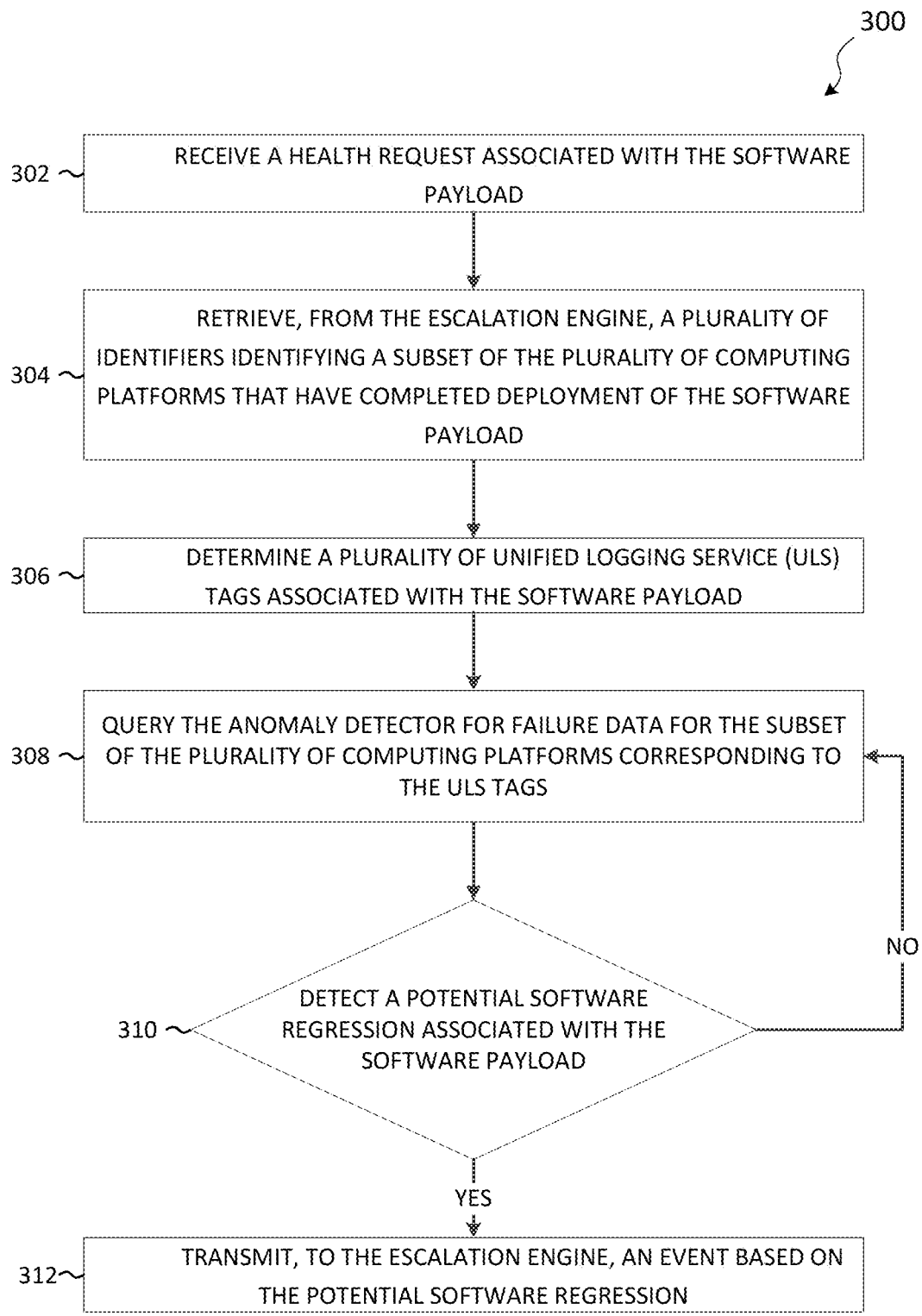
FIG. 3 is a flowchart illustrating a method performed by the system of FIG. 1 for automatically reducing software regression according to some embodiments.

As noted, one or more code changes in a software payload applied to the platforms 116 of the cloud computing environment 112 may cause software regression. An offending code change in a software payload may cause regression across many systems. Manual troubleshooting and remediation of software regression after full rollout of a software payload is time consuming and inefficient. It results in increased periods of degraded computing for users of all platforms. Accordingly, to improve the user experience, it is desirable to automatically monitor the health of software payloads as they are rolled out, and to stop the continued rollout of unhealthy software payloads to maintain efficient and un-degraded operation of the computing platforms. FIG. 3 illustrates an example method 300 for automatically preventing widespread software regression. The method 300 is described as being performed by the system 100, and, in particular, the decision engine 102 and the electronic processor 202. However, it should be understood that in some embodiments, portions of the method 300 may be performed by other devices, including for example, the anomaly detector 104 and the root cause analyzer 106. As an example, the method 300 is described in terms of the decision engine 102 and other components operating to monitor software payload health to prevent software regression in a single cloud computing environment 112 updated by a single software updater 124. However, it should be understood that embodiments of the method 300 may be used with multiple quantities and types of computing environments and software updaters, arranged in various combinations. It should also be understood that embodiments of the method 300 may be used by embodiments of the system 100 that include more than one decision engine 102, anomaly detector 104, or root cause analyzer 106.

In some embodiments, the method 300 is performed when the software updater 124 prepares to rollout a software payload to one or more of the computing platforms 116. At block 302, the electronic processor 202 receives, from the software updater 124 (using a suitable electronic communication protocol or an API), a health request associated with the software payload to be deployed. The health request is requested to determine whether the software updater 124 should proceed or continue with rolling out the software payload. In some embodiments, an unhealthy software payload (that is, one which has been determined to be responsible for a software regression) is not rolled out, or is rolled out in a limited manner. A healthy software payload (that is, one which is not responsible for a software regression, or one that causes only minor software regressions) is rolled out to all applicable computing platforms. In some embodiments, a health request can be requested in a periodic fashion or in response to various trigger events.

At block 304, in response to receiving the health request, the electronic processor 202 retrieves (using a suitable electronic communication protocol or an API), from the escalation engine 120, a plurality of identifiers identifying a subset of the plurality of computing platforms that have completed deployment of the software payload. As noted, the escalation engine 120 tracks the state of the computing platforms 116, and shares this state information with the decision engine 102. In some embodiments, the plurality of identifiers may be received from other sources (for example, the software updater 124).

At block 306, the electronic processor 202 determines a plurality of ULS tags associated with the software payload. For example, the decision engine 102 may request this information, using a suitable protocol or an API, from the software updater. In some embodiments, the plurality of ULS tags is indicative of what features or types of features are affected by the software changes included in the software payload. In some embodiments, this information is received in a payload manifest, for example, sent from the software updater as part of or along with the health request.

At block 308, the electronic processor 202 queries the anomaly detector for failure data, for the subset of the plurality of computing platforms, corresponding to the ULS tags. The failure data includes software failures that occurred on the subset of computing platforms, where the software failures relate to the ULS tags (determined at block 306). The failure data includes pre-deployment failure data and post-deployment failure data. Pre-deployment failure data is based on telemetry data gathered for a computing platform prior to the current software payload being deployed. Post-deployment failure data is based on telemetry data gathered for a computing platform after the current software payload is deployed. Using this data, the decision engine 102 can determine if any problems (software regressions) have occurred in the computing platforms since the software updates in the payload were applied. Such problems include critical exceptions generated by the cloud computing environment 112 and logged to the telemetry server 118, problems reported by users (for example, via a help desk or ticketing system), and the like. In some embodiments, the anomaly detector 104 periodically requests telemetry data from the telemetry server 118, and receives stack traces for critical exceptions along with ULS tags.

At block 310, the electronic processor 202 detects a potential software regression associated with the software payload by comparing the pre-deployment failure data and the post-deployment failure data. For example, in some embodiments, the electronic processor 202 compares failure rates. The electronic processor 202 generates a pre-deployment failure rate for one or more of the plurality of ULS tags based on the pre-deployment failure data. The electronic processor 202 similarly generates a post-deployment failure rate for the at least one of the plurality of ULS tags based on the post-deployment failure data. In some embodiments, the electronic processor 202 compares failure rates by determining a difference between the pre-deployment failure rate and the post-deployment failure rate. In some embodiments, the electronic processor 202 determines that a potential software regression associated with the software payload is detected when the difference exceeds a failure threshold. In some embodiments, the failure threshold is including in a policy associated with at least one of the computing platforms and received from the onboarding portal 122. In some embodiments, certain types of failure data, regardless or quantity, are determinative of a potential software regression. For example, the policy received from the onboarding portal 122 may include one or more critical ULS tags. In such embodiments, the electronic processor 202 detects a potential software regression associated with the software payload based on failures detected for the critical ULS tag(s).

Regardless of how it is detected, at block 312, in response to detecting the potential software regression, the electronic processor 202 transmits, to the escalation engine 120, an event based on the potential software regression. An event is an electronic message, transmitted using a suitable communication protocol or API. The message may include or more of an incident management system log entry, a command to halt deployment of the software payload for a subset of the plurality of computing platforms that have not completed deployment of the software payload, and a command to revert deployment of the software payload for the subset of the plurality of computing platforms that have completed deployment of the software payload.

In some embodiments, the electronic processor 202 also queries the root cause analyzer 106 based on the potential software regression. The electronic processor 202 receives, from the root cause analyzer 106, at least one change list identifier identifying one or more potential root causes for the potential software regression. In such embodiments, the event message is based on the potential software regression and the at least one potential root cause.

In some embodiments, the electronic processor 202 generates a heath indication for the software payload based on potential software regression and the at least one potential root cause, and transmits the health indication to the software updater 124.

The health indication can be used in various ways to take one or more automatic actions or prompt a user to take or initiate one or more automatic actions, including, for example, stopping rollout of a payload, turning off a flight (for example, using a kill switch), reverting to a previous build version, or the like. Various notification and alerts can also be generated to inform other services, systems, and users of any such actions.

Various features and advantages of some embodiments are set forth in the following claims.

What is claimed is:

1. A system for automatically reducing software regression for a software payload applied to a plurality of computing platforms by a software updater, the system comprising:
   an anomaly detector configured to analyze telemetry data for the computing platforms to produce failure data for the computing platforms;
   an escalation engine configured to receive payload rollout data from the software updater and track state information for the computing platforms;
   a decision engine communicatively coupled to the plurality of computing platforms, the software updater, the anomaly detector, and the escalation engine, the decision engine including an electronic processor configured to:

receive, from the software updater, a health request associated with the software payload;

in response to receiving the health request, retrieve, from the escalation engine, a plurality of identifiers identifying a subset of the plurality of computing platforms that have completed deployment of the software payload;

determine a plurality of unified logging service (ULS) tags associated with the software payload;

query the anomaly detector for failure data, for the subset of the plurality of computing platforms, corresponding to the ULS tags, the failure data including pre-deployment failure data and post-deployment failure data;

detect a potential software regression associated with the software payload by comparing the pre-deployment failure data and the post-deployment failure data; and in response to detecting a potential software regression, transmit, to the escalation engine, an event based on the potential software regression.

2. The system of claim 1, further comprising:

a root cause analyzer configured to apply machine learning models to software deployment and monitoring data to identify potential root causes for software failures;

wherein the decision engine is communicatively coupled to the root cause analyzer and the electronic processor is further configured to query the root cause analyzer based on the potential software regression; and receive, from the root cause analyzer, at least one change list identifier identifying at least one potential root cause for the potential software regression;

wherein the event is based on the potential software regression and the at least one potential root cause.

3. The system of claim 1, wherein the electronic processor is further configured to receive, from an onboarding portal, a policy associated with at least one of the computing platforms, the policy including at least one critical ULS tag; and detect a potential software regression associated with the software payload based on the at least one critical ULS tag.

4. The system of claim 1, wherein the electronic processor is further configured to detect a potential software regression associated with the software payload by generating a pre-deployment failure rate for at least one of the plurality of ULS tags based on the pre-deployment failure data;

generating a post-deployment failure rate for the at least one of the plurality of ULS tags based on the post-deployment failure data;

determining a difference between the pre-deployment failure rate and the post-deployment failure rate; and when the difference exceeds a failure threshold, determining that a potential software regression associated with the software payload is detected.

5. The system of claim 4, wherein the electronic processor is further configured to receive, from an onboarding portal, a policy associated with at least one of the computing platforms, the policy including the failure threshold.

6. The system of claim 1, wherein the electronic processor is further configured to determine a plurality of ULS tags by transmitting a request to the software updater.

7. The system of claim 1, wherein the anomaly detector is configured to analyze telemetry data for the computing platforms using at least one selected from the group consisting of an error threshold for a software feature, a machine learning model trained on historical telemetry data associated with the computing platforms, a support vector machine, and a weighted graph.

8. The system of claim 1, wherein the electronic processor is configured to transmit an event by transmitting at least one selected from the group consisting of an incident management system log entry, a command to halt deployment of the software payload for a subset of the plurality of computing platforms that have not completed deployment of the software payload, and a command to revert deployment of the software payload for the subset of the plurality of computing platforms that have completed deployment of the software payload.

9. The system of claim 1, wherein the electronic processor is configured to transmit, to the software updater, a health indication for the software payload based on the potential software regression.

10. A method for automatically reducing software regression for a software payload applied to a plurality of computing platforms by a software updater, the method comprising:

receiving, from a software updater, a health request associated with the software payload;

in response to receiving the health request, retrieving, from an escalation engine, a plurality of identifiers identifying a subset of the plurality of computing platforms that have completed deployment of the software payload determining a plurality of unified logging service (ULS) tags associated with the software payload;

querying an anomaly detector for failure data, for the subset of the plurality of computing platforms, corresponding to the ULS tags, the failure data including pre-deployment failure data and post-deployment failure data;

detecting a potential software regression associated with the software payload by comparing the pre-deployment failure data and the post-deployment failure data;

in response to detecting a potential software regression, querying a root cause analyzer based on the potential software regression;

receiving, from the root cause analyzer, at least one change list identifier identifying at least one potential root cause for the potential software regression; and transmitting, to an escalation engine, an event based on the potential software regression and the at least one potential root cause.

11. The method of claim 10, further comprising:

receiving, from an onboarding portal, a policy associated with at least one of the computing platforms, the policy including at least one critical ULS tag; and detecting a potential software regression associated with the software payload based on the at least one critical ULS tag.

12. The method of claim 10, further comprising:

generating a pre-deployment failure rate for at least one of the plurality of ULS tags based on the pre-deployment failure data;

generating a post-deployment failure rate for the at least one of the plurality of ULS tags based on the post-deployment failure data;

determining a difference between the pre-deployment failure rate and the post-deployment failure rate; and when the difference exceeds a failure threshold, determining that a potential software regression associated with the software payload is detected.

13. The method of claim 12, further comprising:
receiving, from an onboarding portal, a policy associated with at least one of the computing platforms, the policy including the failure threshold.

14. The method of claim 10, wherein determining a plurality of ULS tags includes transmitting a request to the software updater.

15. The method of claim 10, further comprising:
determining the failure data by analyzing telemetry data for the computing platforms using at least one selected from the group consisting of an error threshold for a software feature, a machine learning model trained on historical telemetry data associated with the computing platforms, a support vector machine, and a weighted graph.

16. The method of claim 10, wherein transmitting an event includes transmitting at least one selected from the group consisting of an incident management system log entry, a command to halt deployment of the software payload for a subset of the plurality of computing platforms that have not completed deployment of the software payload, and a command to revert deployment of the software payload for the subset of the plurality of computing platforms that have completed deployment of the software payload.

17. The method of claim 10, further comprising:
transmitting, to the software updater, a health indication for the software payload based on the potential software regression.

18. A non-transitory computer-readable medium including instructions executable by an electronic processor to perform a set of functions, the set of functions comprising:
receiving, from a software updater, a health request associated with the software payload;
in response to receiving the health request, retrieving, from an escalation engine, a plurality of identifiers identifying a subset of the plurality of computing platforms that have completed deployment of the software payload
determining a plurality of unified logging service (ULS) tags associated with the software payload;
querying an anomaly detector for failure data, for the subset of the plurality of computing platforms, corresponding to the ULS tags, the failure data including pre-deployment failure data and post-deployment failure data;
comparing the pre-deployment failure data and the post-deployment failure data to determine whether a potential software regression associated with the software payload is detected;
when a potential software regression is detected, querying a root cause analyzer based on the potential software regression;
receiving, from the root cause analyzer, at least one change list identifier identifying at least one potential root cause for the potential software regression; and
transmitting, to an escalation engine, an event based on the potential software regression and the at least one potential root cause.

19. The non-transitory computer-readable medium of claim 18, the set of functions further comprising:
generating a pre-deployment failure rate for at least one of the plurality of ULS tags based on the pre-deployment failure data;
generating a post-deployment failure rate for the at least one of the plurality of ULS tags based on the post-deployment failure data;
determining a difference between the pre-deployment failure rate and the post-deployment failure rate; and
when the difference exceeds a failure threshold, determining that a potential software regression associated with the software payload is detected.

20. The non-transitory computer-readable medium of claim 18, wherein transmitting an event includes transmitting at least one selected from the group consisting of an incident management system log entry, a command to halt deployment of the software payload for a subset of the plurality of computing platforms that have not completed deployment of the software payload, and a command to revert deployment of the software payload for the subset of the plurality of computing platforms that have completed deployment of the software payload.

* * * * *